(12) United States Patent
Jones

(10) Patent No.: US 9,127,788 B2
(45) Date of Patent: Sep. 8, 2015

(54) AERIAL SHEAVE DEVICE

(71) Applicant: Jameson, LLC, Clover, SC (US)

(72) Inventor: Thomas Lee Jones, Clover, SC (US)

(73) Assignee: Jameson LLC, Clover, SC (US)

( * ) Notice: Subject to any disclaimer, the term of this patent is extended or adjusted under 35 U.S.C. 154(b) by 267 days.

(21) Appl. No.: 13/912,506

(22) Filed: Jun. 7, 2013

(65) Prior Publication Data

US 2014/0138496 A1 May 22, 2014

Related U.S. Application Data

(60) Provisional application No. 61/727,363, filed on Nov. 16, 2012.

(51) Int. Cl.
*F16L 3/18* (2006.01)
*G02B 6/48* (2006.01)
*H02G 1/04* (2006.01)

(52) U.S. Cl.
CPC . *F16L 3/18* (2013.01); *G02B 6/483* (2013.01); *H02G 1/04* (2013.01)

(58) Field of Classification Search
CPC .............. F16L 3/18; G02B 6/483; H02G 1/00; H02G 1/04; H02G 1/06; B66D 3/046
See application file for complete search history.

(56) References Cited

U.S. PATENT DOCUMENTS

| | | | |
|---|---|---|---|
| 516,268 A * | 3/1894 | Hartz | 254/405 |
| 1,878,759 A * | 9/1932 | Copeman | 62/72 |
| 2,806,380 A * | 9/1957 | Martin | 254/390 |
| 3,042,374 A * | 7/1962 | Livingston | 254/134.3 R |
| 4,019,715 A * | 4/1977 | Vugrek | 254/134.3 R |
| 4,160,540 A | 7/1979 | Lindsey et al. | |
| 4,687,365 A | 8/1987 | Promersberger | |
| 5,618,031 A | 4/1997 | Walton | |
| 5,735,505 A | 4/1998 | Walton | |
| 5,941,507 A * | 8/1999 | Page | 254/134.3 PA |
| 6,045,124 A * | 4/2000 | Walton | 254/134.3 PA |

(Continued)

FOREIGN PATENT DOCUMENTS

| FR | 2533771 A1 | 3/1984 |
|---|---|---|
| GB | 951815 A | 7/2009 |

(Continued)

OTHER PUBLICATIONS

International Search Report for PCT/US2013/044681 dated Oct. 8, 2013.

(Continued)

*Primary Examiner* — Jeanette E Chapman
(74) *Attorney, Agent, or Firm* — Shumaker, Loop & Kendrick, LLP

(57) ABSTRACT

Disclosed is an aerial sheave device for the installation and suspension of cable. The aerial sheave device includes a frame and a rotating wheel that coordinates with a locking cable guard. The device also includes a lockable side latch for affording access to the wheel area. The frame may be attached to a utility pole via a loop attached to the frame. The loop attaches to the frame via dome-inside-a-dome connection which allows the frame to also rotate 360 degrees. The dome-inside-a-dome connection includes a solid semispherical dome attached to the loop which fits inside a slightly larger semispherical dome shaped cavity of the frame.

20 Claims, 12 Drawing Sheets

(56) References Cited

U.S. PATENT DOCUMENTS

Figure 10:
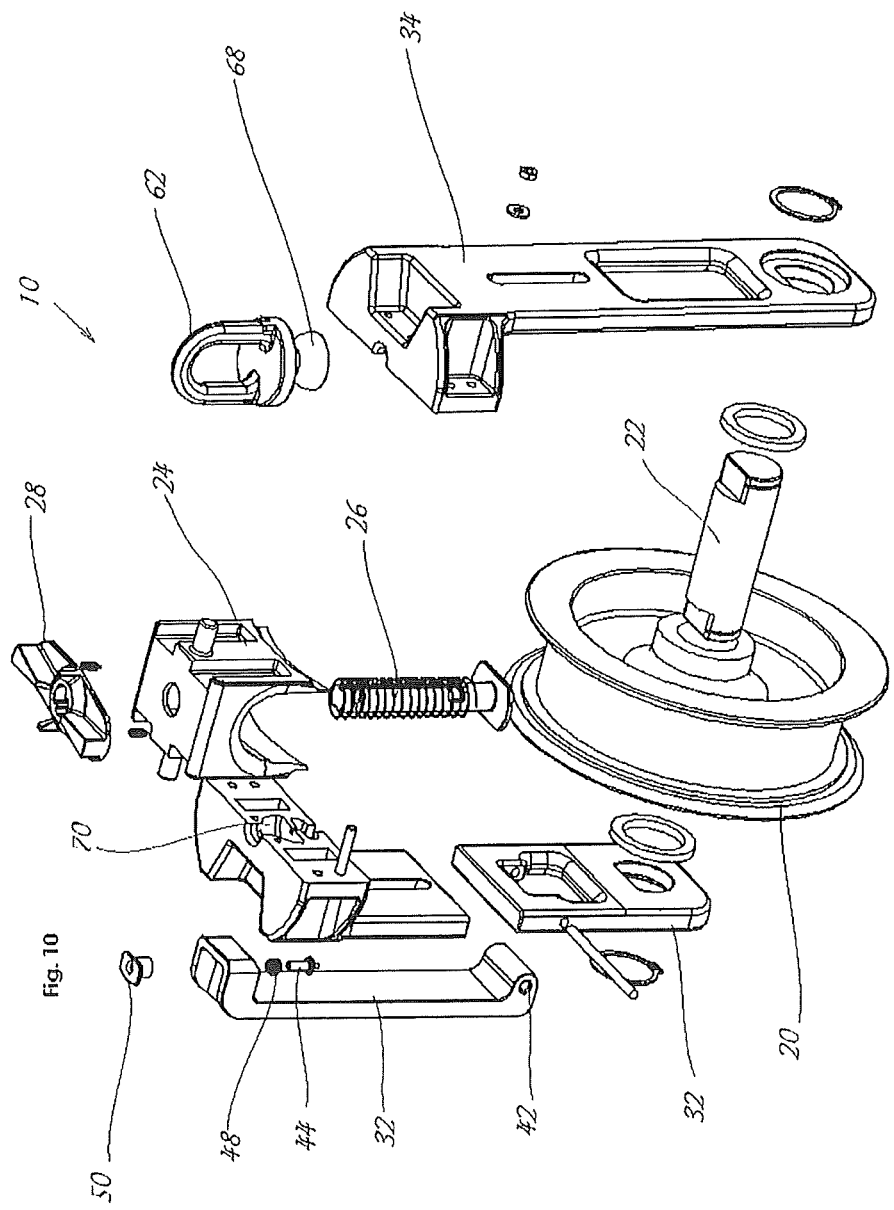

| | | |
|---|---|---|
| 6,315,269 B1 | 11/2001 | Fleury et al. |
| 6,375,163 B1 * | 4/2002 | Carlson et al. ......... 254/134.3 R |
| 6,517,052 B1 | 2/2003 | Lake |
| 6,540,207 B1 | 4/2003 | Barnes |
| 6,666,434 B2 | 12/2003 | Humphrey et al. |

FOREIGN PATENT DOCUMENTS

| | | | | |
|---|---|---|---|---|
| JP | 01308108 | A | * | 12/1989 |
| JP | 02074109 | A | * | 3/1990 |
| JP | 02133013 | A | * | 5/1990 |
| JP | 02151218 | A | * | 6/1990 |
| JP | 02241303 | A | * | 9/1990 |
| JP | 02241307 | A | * | 9/1990 |
| JP | 03040704 | A | * | 2/1991 |
| JP | 2009153244 | A | | 7/2009 |

OTHER PUBLICATIONS

International Preliminary Report on Patentability from the International Preliminary Examining Authority for PCT/US2013/044681 dated May 28, 2015.

* cited by examiner

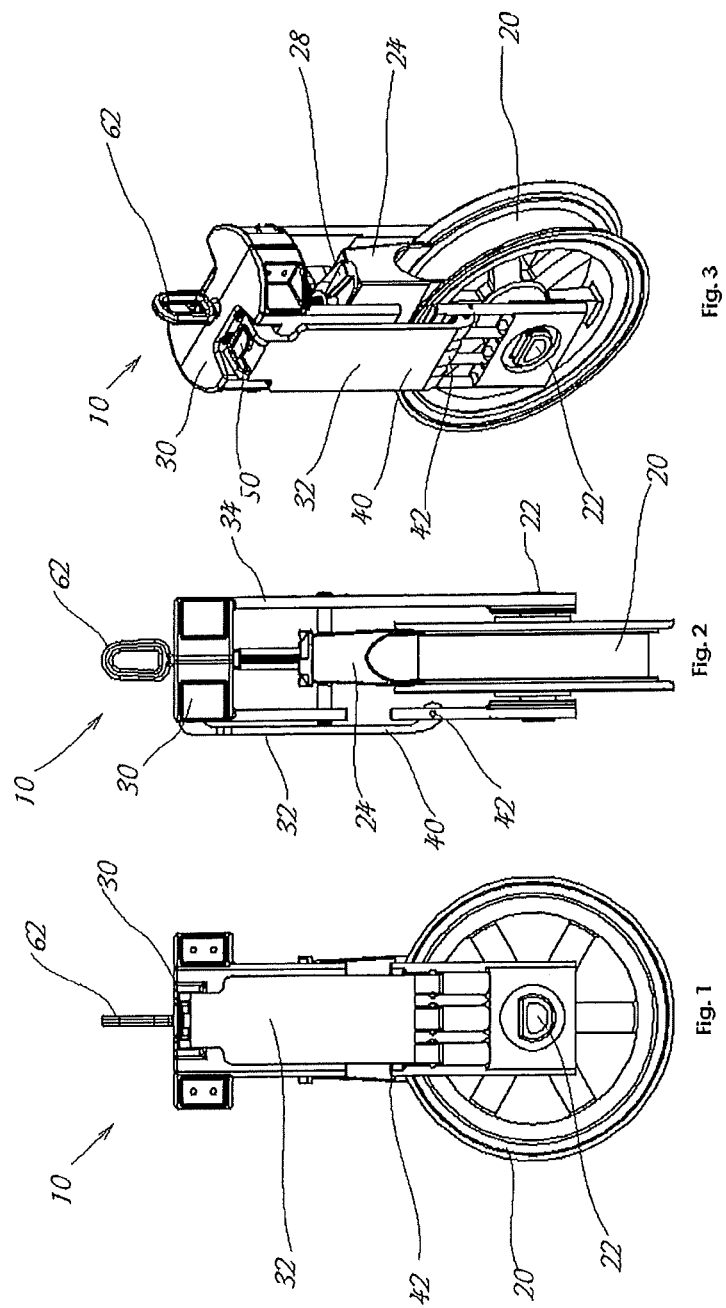

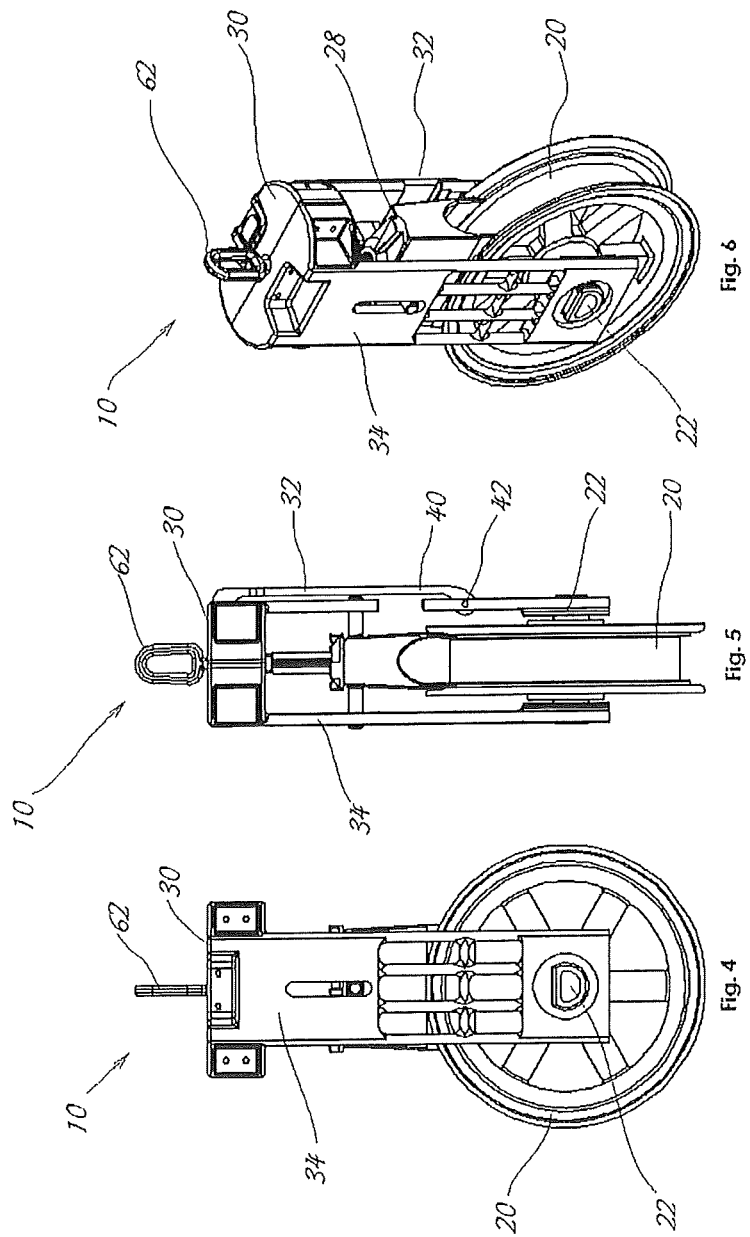

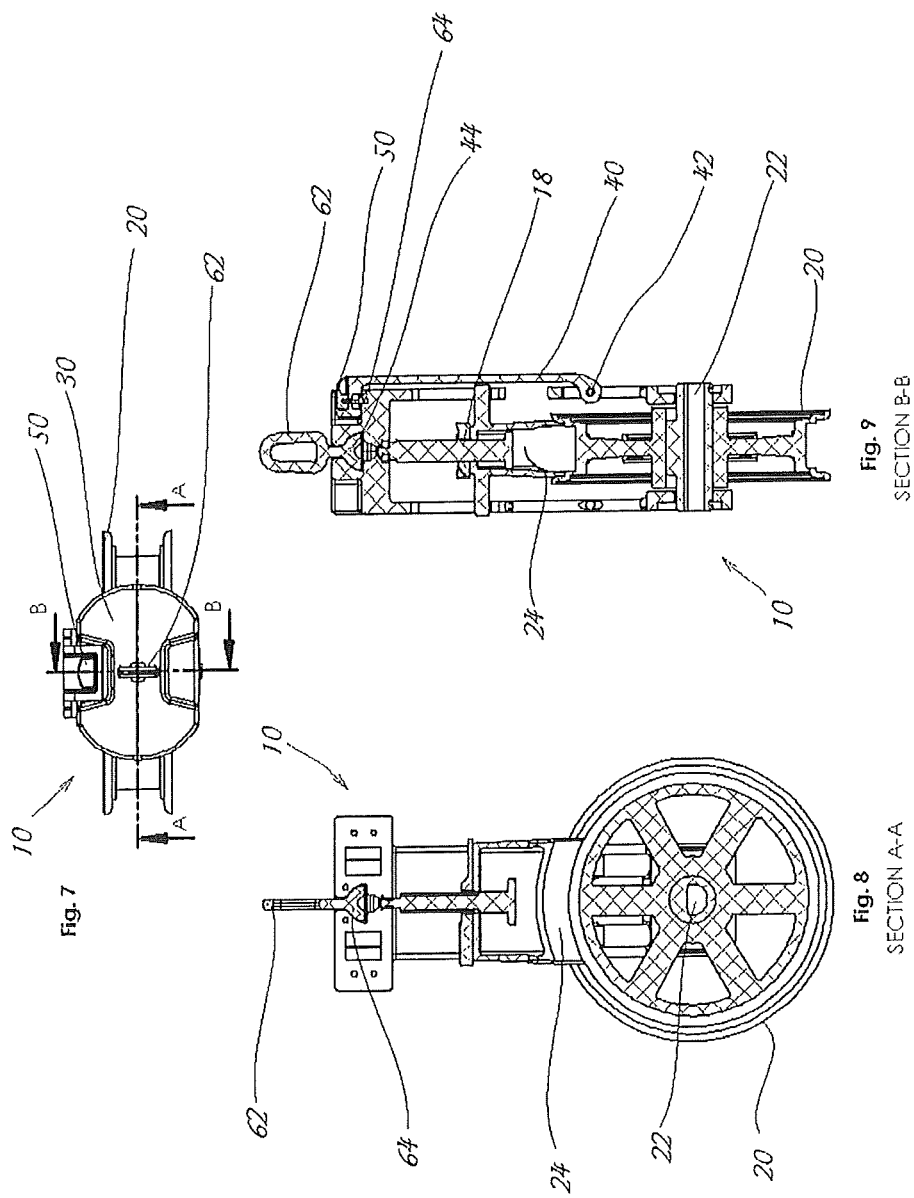

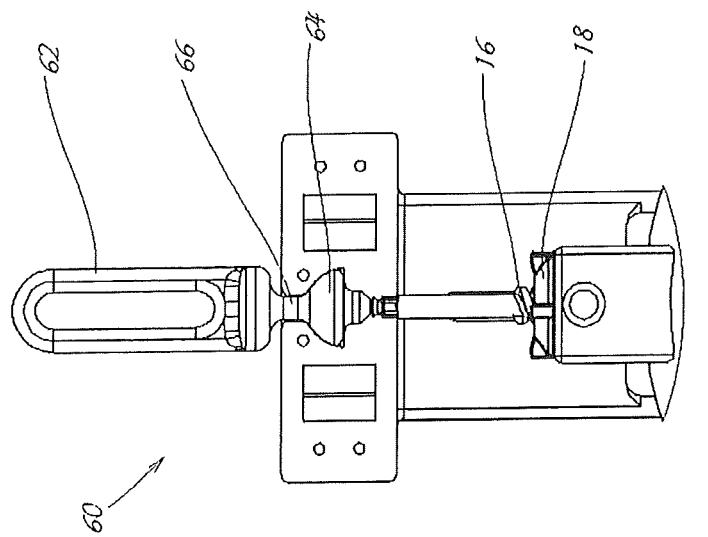
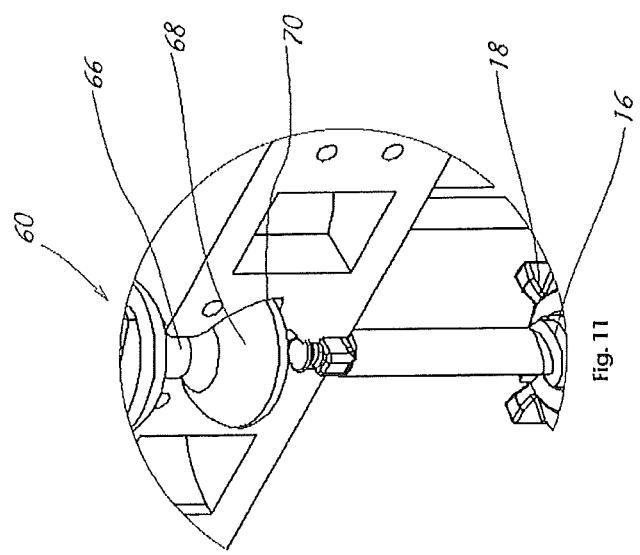

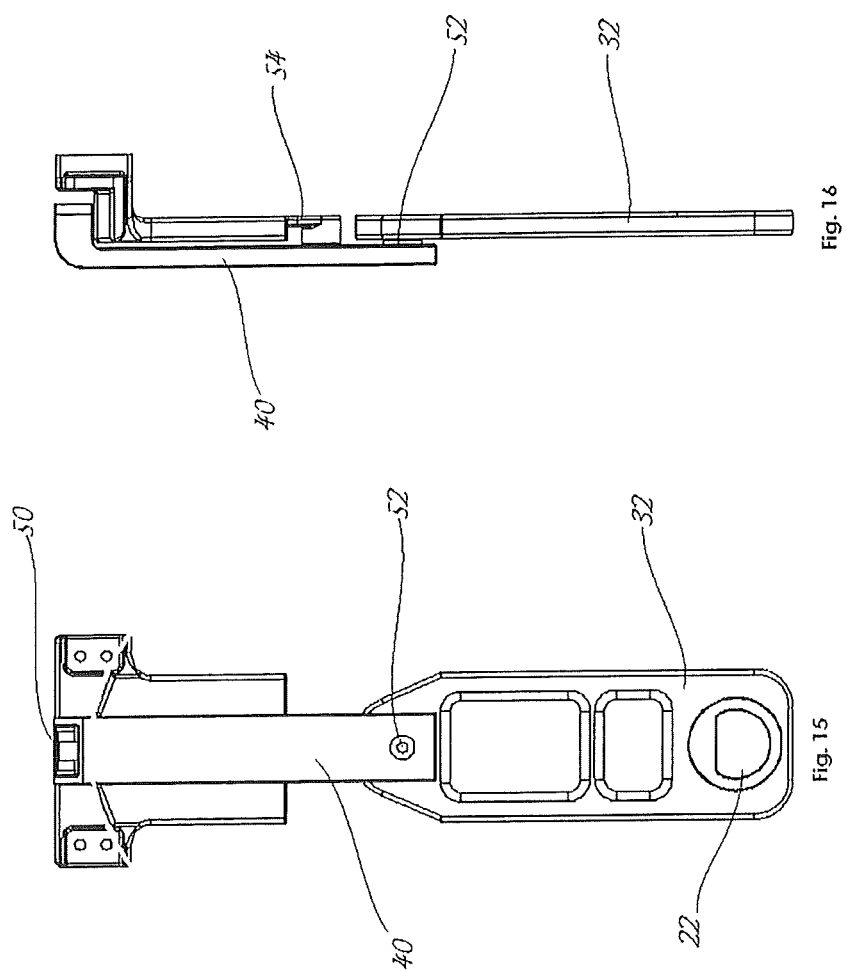

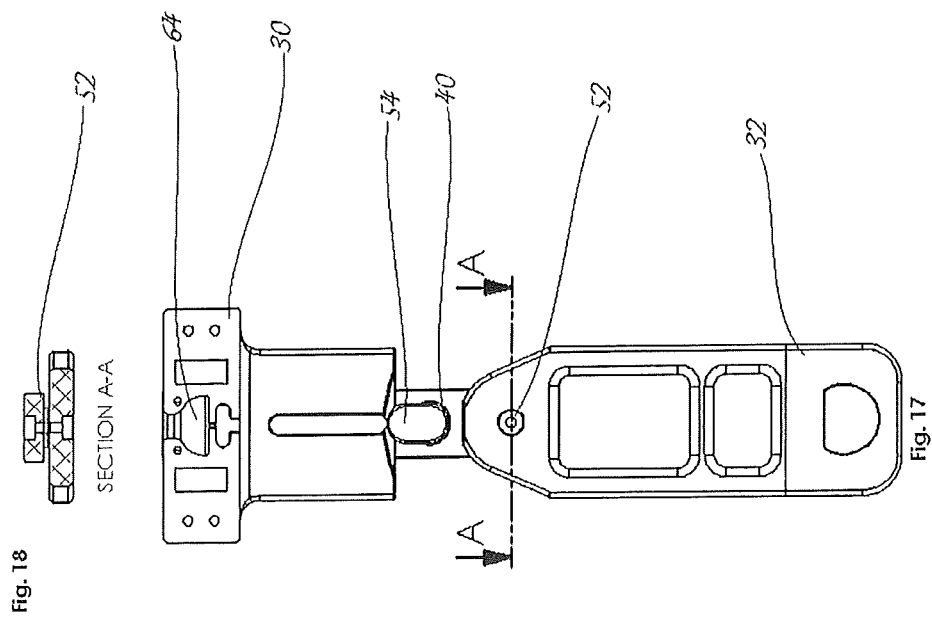

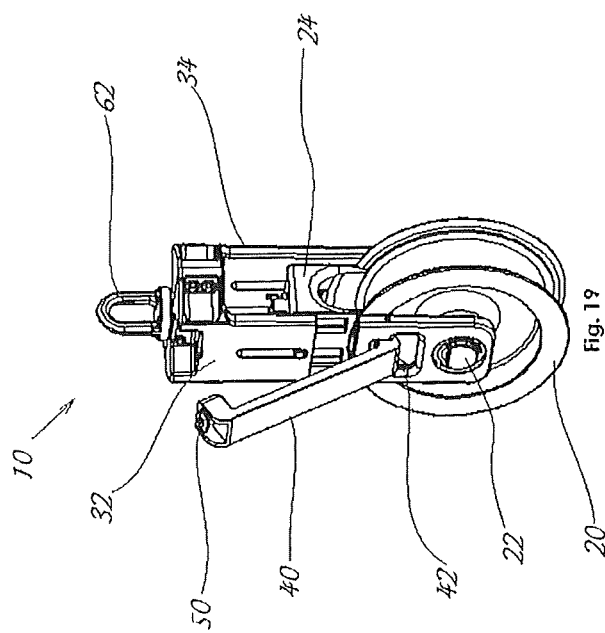

AERIAL SHEAVE DEVICE

This application is a non-provisional of, incorporates by reference, claims the benefit of, and claims priority to U.S. Provisional Application having Ser. No. 61/727,363 filed on Nov. 16, 2012.

TECHNICAL FIELD AND BACKGROUND OF INVENTION

The invention relates to the field of cable installation. More particularly, the invention relates to the field of the installation of suspended cable such as fiber optic cable suspended in the air via poles which are anchored to the ground.

In the field of cable installation, cables are often suspended overhead on utility poles. Though telegraph cables were the first cables to be suspended on poles in the Nineteenth Century after buried cable proved faulty, today many cables are suspended. Suspending cables overhead is an inexpensive way to both insulate the cables from the ground and to keep them out of the way of people, vehicles, structures, paths, roads, and the like. Power cables used for distribution and subtransmission lines are commonly suspended from utility poles. Larger towers, in place of poles, are often used for power transmission lines. In the field of telecommunications, it is common for various types of cable to be suspended on poles or other structures and the telecommunication cables may use the same poles or structures as power lines. For instance, telephone cable may be suspended on poles for the delivery of commercial telephone service to residences and businesses. Likewise, coaxial cable may be suspended for the delivery of cable television services. Coaxial and telephone cables may also be suspended on poles in order to deliver internet and other data communication services. Similarly, optical cables such as fiber optic cable or other communication cables such as Category 5 or Category 6 cables may be suspended. It is also common for speaker cables, public address cables, and the like to be suspended in certain applications.

Though the suspension of cables on poles and other overhead structures has many benefits, there are also disadvantages related to installation. For instance, because of the height of the poles or other structures, ladders, lifts, or other elevation equipment must be utilized in order to reach the cables and their various attachments. As cables can be strung for runs of thousands of feet, and indeed miles, the task of suspending cables from pole to pole can be labor intensive. Thus, there is a need in the art for a device that improves the process of suspending cables.

The task of suspending cables is exacerbated when the cables are fragile. Whereas a copper electrical cable may withstand significant pulling, bending, and wear during a process of suspension, fragile cables such as fiber optic cables may easily become damaged during overhead installation. This damage can occur when too much pressure or stress is applied to a cable. This damage can occur when a cable bends too sharply around a corner. This damage can occur when the cable gets caught around the axle of a pulley in prior sheave art. The damage can also occur when various parts, such as latches, of prior art sheaves become detached such that the cable becomes removed from the prior art sheaves. This damage can also occur because prior art sheaves have no way to retain the cable as it tightens or slackens while it is being pulled. Damage may also occur when splices in cable become lodged in the sheave causing undue strain or stress on the cable such as when an operator does not stop pulling the cable in time to prevent damage to the cable. Thus, there is a need in the art for a device that enables the safe installation of fragile cables such as fiber optic cables.

Damage to fragile cables can also occur when the profile or "floor" of a sheave is not uniformly round. It is common in the art of sheave and pulley design to have the wheel of the sheave or pulley have spokes supporting and distancing the "floor" of the sheave from the hub or axle of the wheel, much like a bicycle wheel. One problem in the art occurs when sheaves are made of plastic. When a plastic sheave is formed, it typically shrinks as it is curing. Thin parts will set and cure quicker than thick parts and this disparity can cause thin portions of the wheel to cure quicker than thicker portions. When portions of the plastic floor are not supported by the spokes, the floor tends to shrink towards the hub whereas the portions directly supported by the spokes shrink mush less and remain, relatively in place. This shrinkage differential can cause the floor of the pulley wheel to have peaks and valleys. These peaks and valleys are more pronounced as the wheel diameter is increased in size. Peaks and valleys in the wheel act to defeat the benefits of a wheel in the first place and importantly can damage fragile fiber optic cable. Thus, there is a need in the art for a plastic sheave wheel design that minimizes or eliminates peaks and valleys, especially in larger sheave wheels.

Further, as cables often carry electrical current, there is a risk that those who install such cables or who operate and install other cables which are close to power cables may become electrocuted. Thus, there is a need for a dialectically strong assembly due to the potential proximity to power cables.

Further, as cables are also suspended or otherwise installed in buildings, there is also a need in the art to allow cables, such as fragile fiber optic cables, to be quickly, easily, and safely installed around corners so that the cables do not become damaged. There is also a need in the art for a sheave that is lightweight and efficient to manufacture.

SUMMARY OF THE INVENTION

It is therefore an object of the present invention to provide an aerial sheave device that facilitates and improves the process of suspending cables. It is a further object of the invention to provide an aerial sheave device that reduces stress and pressure and forces applied to cables during installation. It is a further object of the invention to provide an aerial sheave device that prevents cable and cable extension such as pull tape from being damaged or lodged in various parts of the sheave such as in the wheel. It is a further object of the invention to provide an aerial sheave device that insulates a cable installer or operator from dangerous power transmission. It is a further object of the invention to provide an aerial sheave device that is lightweight, durable, and efficiently manufactured. It is a further object of the present invention to provide a plastic sheave wheel of a sheave that minimizes or eliminates peaks and valleys, especially in larger sheave wheels such that the wheel is substantially smooth and round.

These and other objects and advantages of the invention are achieved by providing an aerial sheave device for the installation and suspension of cable. The device enables an installation crew to safely install cable, especially fragile cable such as fiber optic cable, in environments that are difficult to reach, in environments where the cable may be damaged, and in environments where attachment points may be spaced far apart. The device prevents the damage to the cable from sharp bends. The device is designed so that, once engaged, the cable may not slip off of the pulley of the sheave unless the operator desires the cable to be removed. The device is designed to be flexible and move in many directions so that the cable does not bind or detrimentally bend or jam during installation. The device is preferably made from non-conductive material such as plastic.

According to an embodiment, the sheave is designed to withstand typical forces experienced during the process of pulling aerial fiber optic cable lines from pole to pole. This feature is especially important for the fiber optic cable installation as the cable can easily break or become damaged when too much tension is applied. The sheave is preferably entirely made from plastic, though some parts such as springs and fasteners may be metal, and there may also be an internal, non-exposed metal insert to improve rigidity, and all exposed surfaces have a high dielectric strength and are non-conductive. The exposed surfaces are preferably made from nylon or thermoplastic polyurethane. Any exposed metal surfaces may be shielded in some fashion to prevent accidental contact.

According to an embodiment of the invention, the aerial sheave may include a pulley wheel which rotates around an axle attached to a frame. The frame may include a rigid side, a top side, and a latch side. A latch is attached to the latch side of the frame. The latch provides access to the wheel of the sheave and the latch may operate from an open to a closed position. The latch may include a spring loaded plunger which may be biased in the closed position. The plunger may secure the latch to the frame in the closed position. The sheave may further include a swivel-loop attachment. The swivel-loop attachment may include a loop portion which extends above the top side of the frame and a semispherical solid dome portion which fits within a semispherical dome cavity portion of the top side of the frame. The sheave may further include a locking guard which is attached to the frame. The locking guard may operate from a locked position to an unlocked position. The locking guard may have a spring for biasing the guard in the unlocked position and may also have a lever for locking the guard in the locked position. According to such a locking guard, a turn of the lever in a first direction will unlock the guard and another turn of the lever in an opposite direction in combination with pressure applied against the spring will lock the guard. Further, the combination of the locking guard and wheel opening comprises a size and shape (rounded edges) so as to allow standard cable splice technologies and adjunction installation aides such as attached pull grips to easily pass through the opening with minimal drag.

According to another embodiment of the invention, the latch side may be located on either a left or a right side of the frame. Further, the latch may be attached to the frame via hinge connection or via a pivot pin connect. Where a hinge connection is utilized, when the latch is in the open position, the latch swings out and away from the top side of the frame about the hinge towards a lower end of the pulley wheel. Where a pivot pin connection is utilized, when the latch is in the open position, the latch rotates parallel to the frame and towards a lower end of the pulley wheel. The latch may further include a stop tab which secures the latch to the frame in the closed position and also prevents the latch from swinging about the pin beyond 130 degrees in either direction when in the operating position. The tab also allows the swing latch to swing far enough that it does not interfere with the loading or removal of cable.

According to another embodiment of the invention, the pulley wheel may have a substantially U shaped profile and the locking guard may have an inverted substantially U shaped profile that meshes with the U shaped profile of the pulley wheel. When meshed where the locking guard is in the locked position, the combination may form a closed cable passageway having a substantially 0 shaped profile. Further, the substantially U shaped profile of the pulley wheel may include an outward flange and the inverted substantially U shaped profile of the locking guard may include an inward flange. In such an embodiment, the respective flanges support the meshing of the pulley wheel and the locking guard.

According to another embodiment of the invention, the lever of the locking guard may be actuated by a 90 degree turn. In another embodiment, the lever of the locking guard may be actuated by a 270 degree turn. In another embodiment, the locking guard may be actuated by a series of 360 degree turns in similar fashion to a threaded nut and bolt.

According to another embodiment of the invention, the loop portion of the swivel-loop attachment is attachable to a fixed pole and the semispherical solid dome portion is rotatable 360 degrees.

According to another embodiment of the invention, the pulley wheel and the locking guard may be made of nylon. According to another embodiment, the pulley wheel and locking guard may be made of a durable plastic. Further, the frame may be made of nylon but also include an internal, non-exposed U-shaped channel made of steel. According to another embodiment, the frame or any plastic parts may be made of nylon or other durable plastic and include an internal channel or rod made of steel or any structural metal.

According to an embodiment of the invention, the sheave includes a pulley wheel that rotates on an axle. The pulley wheel has a "U" or cupped profile that captures a cable at least partially within. A cable guard captures the remainder of the cable so that there is no gap between the wheel and the guard where the cable or cable extensions such as pull tape might become lodged, stuck, or otherwise disengaged from the wheel. The axle is attached to a frame on both a rigid side of the frame and a latch side of the frame. A top side of the frame connects the latch side of the frame to the rigid side of the frame. The latch side of the frame includes a closeable latch that operates from an open position to a closed position.

According to an embodiment of the invention, the latch is retained in the closed position with a pin type connection.

According to another embodiment of the invention, the latch is retained in the closed position with a spring loaded plunger on one end and a hinged connection on the other end. The spring functions to bias the plunger in the locked position that, thereby, secures the latch in the closed position when the latch is closed. The plunger slides through a hole in the latch and into a cavity in the top side of the frame when in the closed position. A two finger lift release is attached to the top of the plunger. In order to move the latch to the operating position, two fingers are inserted under the lift release and the lift is pulled upward, thereby applying pressure to the spring and lifting the plunger from the cavity in the top side of the frame. With the plunger removed from the cavity, the latch, hinged to a lower portion of the latch side of the frame, falls away from the top side of the frame and affords access to the inside of the frame and thus to the pulley wheel. In order to return the latch to the closed position, an operator presses the side of the latch, causing the latch to rotate on its hinge, until the top of the latch firmly meets the top side of the frame. In so doing, the plunger will reenter the cavity in the top side of the frame and the biasing spring will engage the plunger in to the cavity to lock the latch.

According to an embodiment of the invention, the sheave includes a swivel loop arrangement rotatingly attached to the top side of the frame. The swivel allows the frame, and thus the pulley on the axle, to swivel 360 degrees and the loop allows the frame to rotate from vertical to horizontal. The loop is an elongate loop having a central open cavity. The swivel mechanism utilizes a dome-inside-a-dome connection. This dome-inside-a-dome connection includes a dome shape cavity, in the shape of an approximate semisphere cavity, formed within the top side of the frame. A slightly smaller solid dome, in the shape of an approximate semisphere, that matches the shape of the dome shape cavity, fits within and rotates within the dome shape cavity. This solid dome is fixedly attached to a solid cylindrical portion which is then attached to the loop. The smaller dome is thus embedded within the dome cavity of the frame and is made from plastic. In use, the loop is attached to some fixed point, such as a hook, bolt, tie, rope, or other connection on a pole. The entire device may then rotate horizontal to vertical via the loop and may also rotate in a 360 degree circle via the swivel dome-inside-a-dome connection. Thus, the cable being pulled may come from an adjacent pole or from a ground spool. Similarly, the cable being pulled may be going onto a pole located at any angle or to a ground puller. In each of these instances, the fiber optic cable will not be damaged.

According to another embodiment of the invention, the connection may utilize a puck shape fitting inside a cylindrical cavity.

According to another embodiment, the loop itself has as generally "C" shape and an attached closure mechanism such as a latch which bridges the open portion of the "C" shape to close the loop.

According to another embodiment, the sheave includes a cable guard having a ¾ turn locking nut to hold the guard in place. The guard is attached to the frame and operates from an operating or locked position where the guard is fixed to an open or unlocked position that allows a cable to enter the pulley wheel area. As discussed above, the guard is designed to keep the cable on the wheel of the pulley or sheave. The guard operates closely with the pulley so that even thin "pull" or "mule" tape cannot dislodge between any gap between the guard and the wheel. When the guard is locked in the operating position, the cable may not slip from the pulley wheel. In this embodiment, the ¾ turn nut may be easily turned and locked down by turning the nut approximately 270 degrees from an open position. From the locked position, turning the nut 270 degrees will release the guard so that the guard rises enough to allow a cable to enter. Similarly, turning the nut in the opposite direction 270 degrees will return the guard to the locked position. The nut may operate having internal threads that engage external threads of a central axis. The external threads of the central axis may be spaced apart sufficiently so that the nut moving on the threads raises the guard sufficiently to allow a cable to enter the gap between the guard and the wheel when the guard is in the unlocked position. The central axis may be aligned with the solid cylindrical portion of the swivel loop arrangement.

According to another embodiment, the sheave includes a cable guard having a ¼ turn lock. Like the cable guard of other embodiments, the guard is attached to the frame and operates from an operating or locked position where the guard is fixed to an open or unlocked position that allows a cable to enter the pulley wheel area. The guard is designed to keep the cable on the wheel of the pulley of the sheave during operation. The guard operates closely with the pulley so that even thin "pull" or "mule" tape cannot dislodge between any gap between the guard and the wheel. This pull tape is completely captured by the sheave and may not slip during use. The cable guard has an inverse "U" profile that is roughly 180 degrees opposite the "U" profile of the wheel. Thus, the two edges of the "U" profiles meet to form a space roughly in the shape of an "0" wherein the cable operates on the wheel when the guard is in the locked position. When the guard is locked in the operating position, the cable and cable extensions such as pull tape may not slip from the pulley wheel. The lock of the cable guard may be manipulated from either side of the open sides of the sheave. A spring is attached to the cable guard to bias the guard in the unlocked or open position when the lock is not engaged. In order to secure or lock the cable guard in the locked position, the operator pushes the guard down (opposite the biasing of the spring) until the guard bottoms out. The operator then turns a lock dial clockwise ¼ turn to lock the guard in the operating position. From this locked operating position, when the lock is turned counter clockwise, the biasing spring will lift the guard enabling the removal of a cable from the wheel.

BRIEF DESCRIPTION OF THE DRAWINGS FIGURES

Figure 13:
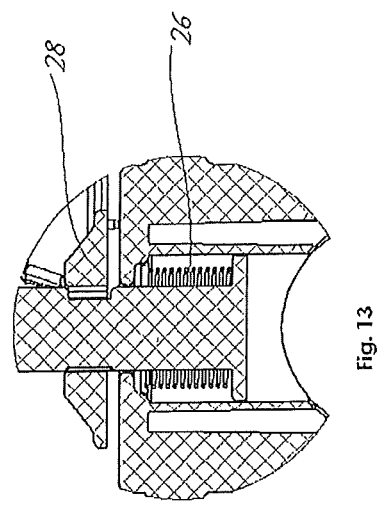
Figure 14:
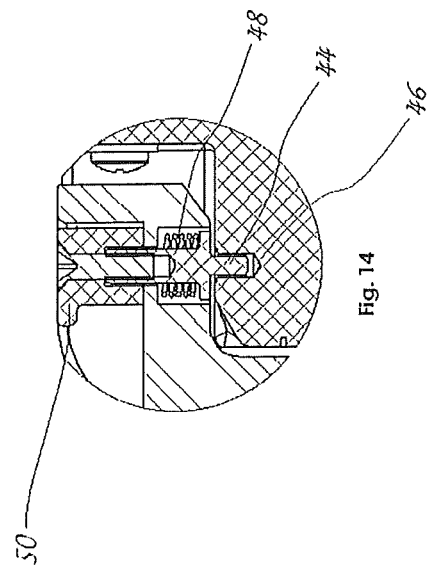
Figure 20:
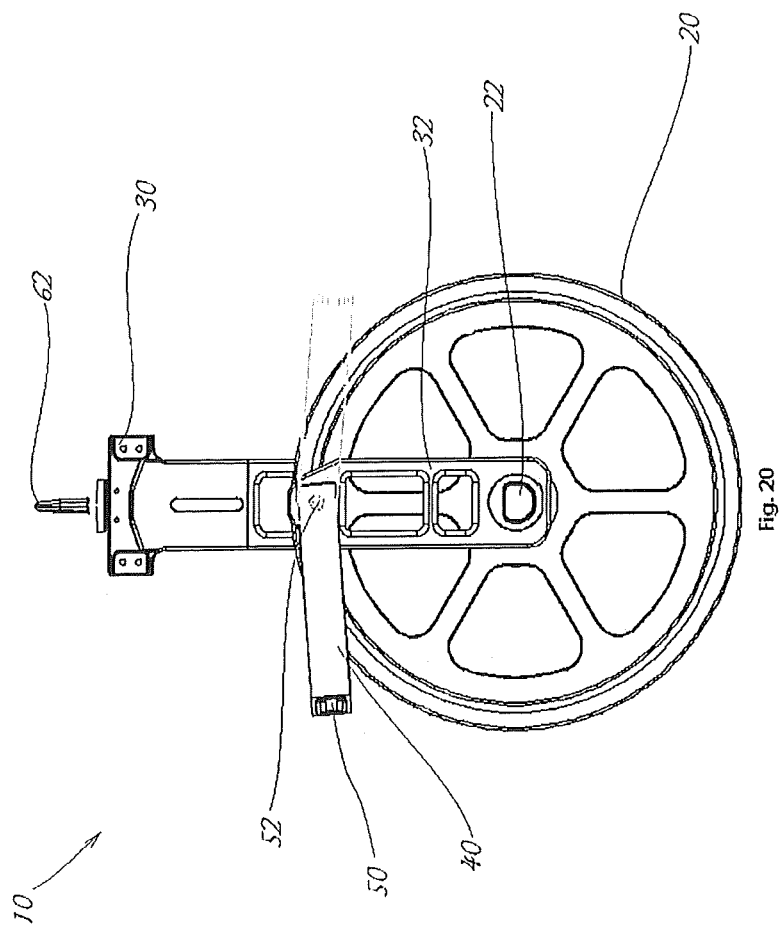
Figure 21:
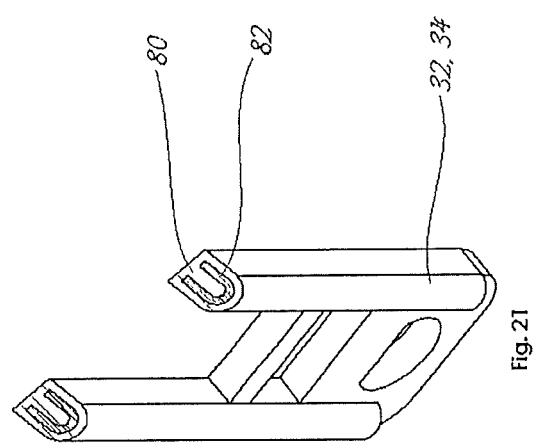
Figure 22:
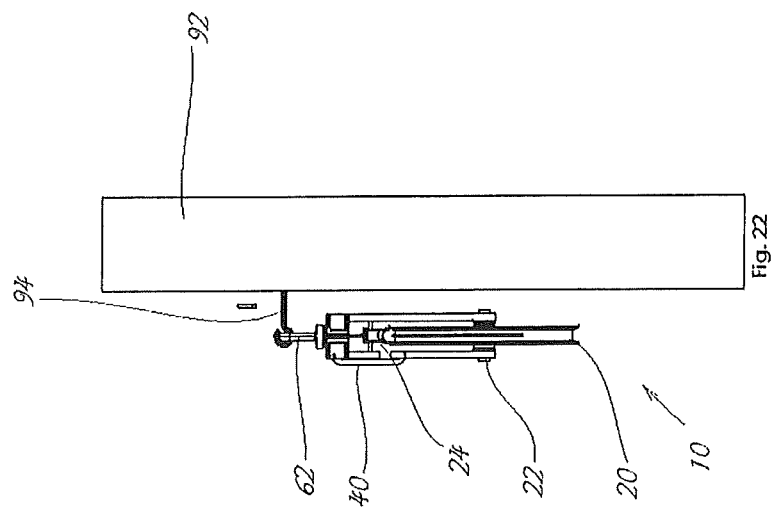
Figure 23:
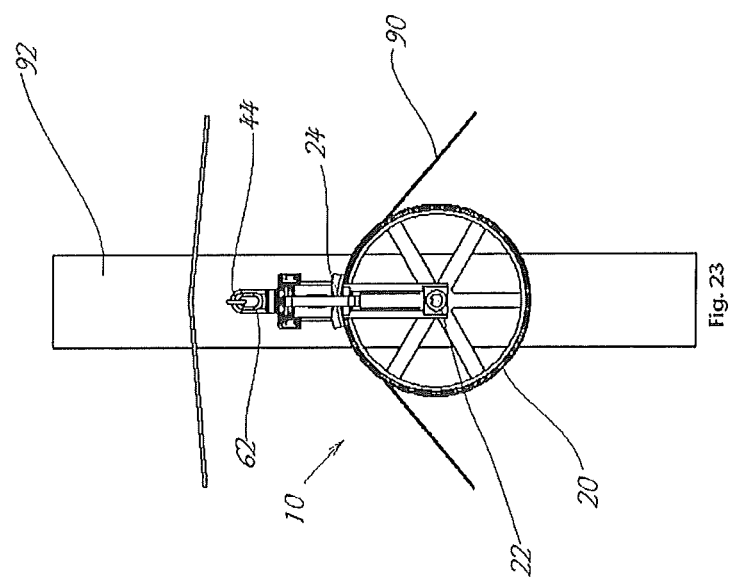

Features, aspects, and advantages of a preferred embodiment of the invention are better understood when the detailed description is read with reference to the accompanying drawing, in which:

FIG. 1 is a latch side view of an embodiment of the sheave;
FIG. 2 is an end side view of an embodiment of the sheave;
FIG. 3 is a perspective view of an embodiment the sheave;
FIG. 4 is a rigid side view of an embodiment of the sheave;
FIG. 5 is an end side view of an embodiment of the sheave;
FIG. 6 is a perspective view of the sheave;
FIG. 7 is a top view of the sheave;
FIG. 8 is a sectional cutaway side view of the sheave of FIG. 7;
FIG. 9 is a sectional cutaway end view of the sheave of FIG. 7;
FIG. 10 is an exploded perspective view of the sheave;
FIG. 11 is a partial sectional perspective view of an embodiment of the sheave showing the dome-inside-a-dome connection of the swivel loop mechanism;
FIG. 12 is a partial sectional side view of an embodiment of the sheave showing the dome-inside-a-dome connection of the swivel loop mechanism;
FIG. 13 is a partial side sectional view of an embodiment of the sheave showing the biasing spring of the cable guard;
FIG. 14 is a partial side sectional view of an embodiment of the sheave showing the biasing spring and plunger of the side latch;
FIG. 15 is a side view of an embodiment of the sheave showing swing of the pivot pin latch;
FIG. 16 is a side view of an embodiment of the sheave;
FIG. 17 is a partial sectional side view of an embodiment of the sheave;
FIG. 18 is a partial cutaway top side view of an embodiment of the sheave of FIG. 17;
FIG. 19 is a perspective view of the sheave showing the hinged latch in the open position;
FIG. 20 is a side view of an embodiment of the sheave showing the pivot pin latch in the open position;
FIG. 21 is a partial cutaway perspective view of the rigid side of an embodiment of the sheave showing the steel U-channel insert;
FIG. 22 is an end environmental view of the sheave attached to a utility pole; and
FIG. 23 is a side environmental view of the sheave attached to a utility pole.

DETAILED DESCRIPTION

The present discussion is a description of exemplary embodiments only and is not intended as limiting the broader aspects of the present invention. The following example is provided to further illustrate the invention and is not to be construed to unduly limit the scope of the invention.

Referring to the drawings wherein identical reference numerals denote the same elements throughout the various views, FIGS. 1-10 are directed to an embodiment of the sheave 10 having a pulley wheel 20 that rotates on an axle 22. The wheel 20 is circular and has a generally "U" shaped profile that cradles a cable 90 that operates on the wheel 20 as shown in the environmental views of FIGS. 22 and 23. The axle 22 is attached to a frame that has a top side 30, a latch side 32, and a rigid side 34. A cable guard 24 is also attached to the frame and the cable guard 24 has a generally inverted "U" shape that coordinates with the "U" shape of the wheel 20. The way in which the "U" shape of the wheel 20 and the inverted "U" shape of the cable guard 24 coordinate with each other is an important aspect of the invention 10. As best shown in FIGS. 2, 5, and 9, the guard 24 meets with the wheel 20 so that there is no gap through which a cable 90 may pass when the guard 24 is in a locked or closed position.

In the embodiment of the invention 10 shown in FIGS. 1, 2, 3, and 13, the cable guard 24 operates from a locked or closed position to an unlocked or open position through the operation of a spring bias 26 and a ¼ turn locking lever 28. As shown in FIG. 13, a spring 26 biases the cable guard 24 in the unlocked or open position when it is not locked down. In order to lock the cable guard 24 in the closed or locked position, an operator must press down on the cable guard 24 and actuate the lever 28 to the locked position. To unlock the lever 28, the operator simply moves the lever 28 to the unlocked position. The locking lever 28 as shown in FIG. 3 rotates approximately 90 degrees clockwise and 90 degrees counter clockwise.

In the embodiment shown in FIGS. 5, 7, 8, 9, 11, and 12, the cable guard 24 also operates from a locked or closed position to an unlocked or open position. However, in this embodiment, there is no biasing spring 26 and the operation of locking the cable guard 24 is achieved by using a ¾ locking nut 18. The nut 18 has internal threads which act on and mesh with external threads 16 attached to the frame. As the nut 18 is turned, the guard 24 is released and is manually lifted in order to afford access to the wheel 20.

The latch 40 of the latch side 32 of the frame is hingedly attached to the frame in one embodiment as shown in FIGS. 1-10 and 19. Preferably, the hinged portion 42 of the latch 40 is located at a lower portion of the latch 40 and attaches to a lower portion of the latch side 32 of the frame at a point above the axle's 22 attachment to the frame. As best shown in FIG. 19, the latch 40 removably attaches to an upper portion of the latch side 32. As shown in FIGS. 10 and 14, the attachment uses a plunger 44 in a cavity 46 connection. The plunger 44 is cylindrical and is attached to the latch 40. The plunger 44 enters a cavity 46 in the latch side 32 of the frame when the latch 40 is in the closed position. The plunger 44 includes a spring 48 that biases the plunger 44 in the closed position. The plunger 44 has a top lifting tab 50 attached at a point opposite the point of entry into the cavity 46 of the frame. The lifting tab 50 is designed so that an operator may lift the plunger 44 out of the cavity 46, thereby countering the spring bias 48, and enable the latch 40 to move from the closed or locked position to an open or unlocked position as shown in FIGS. 19 and 20.

In an alternate embodiment of the invention 10, as shown in FIGS. 15-18 and 20, the latch 40 is not hingedly attached to the latch side 32 of the frame but is, instead, pivotally attached. In this embodiment, rather than the latch 40 falling away from the frame about the hinge 42 as in FIG. 19, the latch 40 pivots about a pin connection 52 and pivots away from the frame in a direction parallel to the latch side 32 of the frame. In this embodiment, pivot tab 54 helps to retain the latch against the latch side 32 of the frame in the closed position and also functions as a stop to stop the pivot of the latch 40 beyond a midpoint on the length of the latch side 32 of the frame.

Importantly, the invention 10 includes a swivel loop arrangement 60 as highlighted in FIGS. 11 and 12. The swivel loop arrangement facilitates the connection of the sheave 10 to a utility pole 92 as shown in FIGS. 22 and 23 and also the operation of the sheave 10 once connected to the pole 92. This connection utilizes a loop 62 and a dome-inside-a-dome swivel 64. FIGS. 11 and 12 are sectional views that show how the swivel loop 60 is connected to the top 30 of the frame. The loop 62 includes a generally "O" shaped loop 60 attached to a cylindrical extension 66. The cylindrical extension 66 is molded onto a generally semispherical shaped solid dome 68. This solid dome 68 fits within a slightly larger generally semispherical shaped dome cavity 70. Rather than solid, the dome 68 may be hollow with a certain minimum wall thickness. Thus, the frame may rotate 360 degrees around the solid dome 68. Further, the device 10 may pivot and rotate at least 180 degrees via the loop 62 around an attachment point such as a hook 94 fixed to a utility pole 92.

Thus, as shown in FIGS. 22 and 23, in practice, a hook 94 will be attached to a utility pole 92. The loop 62 will be attached to the hook 92. An operator will pull up on the tab 50 of the plunger 44 to release the latch 40. Pulling up on the tab 50 will counter the bias spring 48 and pull the plunger 44 out of the cavity 46. An operator will unlock the guard 24 by rotating the lever 28 and the biasing spring 26 will raise the guard 24. Alternatively, the operator will turn the nut 18 to raise the guard 24. An operator will then load a cable 90 or a mule tape (not shown) attached to cable 90 through the wheel 20. The operator will then press down on the guard 24 and then actuate the lever 28 to lock the guard 24. Alternatively, the operator will actuate the locking nut 18. The operator will then push the latch 40 into place and the plunger 44 will engage the plunger cavity 46 by operation of the bias spring 48 of the latch 40. The operator may then suspend cable 90 as desired. The sheave 10 will pivot 180 degrees about the hook 94 and rotate 360 degrees about the swivel 64.

Similarly, when mule tape attached to cable 90 is utilized, the mule tape may be loaded onto the sheave 10 while the latch 40 and the locking guard 24 are in the closed or locked positions.

In order to unload the cable 90 from the sheave 10, the reverse process is employed. The operator will unlock the guard 24 by rotating the lever 28 or by actuating the locking nut 18. The guard 24 will rise via the biasing spring 26 or by the threaded connection 16. The operator will then release the latch 40 by pulling up on the tab 50 and the latch 40 falling about the hinged connection 42 or about the pivot connection 52. The operator will then remove the cable 90 from the sheave 10.

Referring to FIG. 21 which is a partial perspective cutaway view of a side 32, 34 of the frame, the frame of the sheave is primarily made of nylon 80. However, the frame may include a steel U-shaped channel 82 which is inset within the nylon 80. The steel U-shaped channel 82, or steel insert having another shape, may provide rigidity against bending.

The foregoing has described an aerial sheave 10. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

I claim:

1. An aerial sheave device for the installation and suspension of cable comprising:
   a. a pulley wheel rotating around an axle attached to a frame having a rigid side, a top side, and a latch side;
   b. a latch attached to the latch side of the frame for providing access to the wheel of the sheave, operating from an open to a closed position, having a spring loaded plunger biased in the closed position for securing the latch to the frame in the closed position;
   c. a swivel-loop attachment including a loop portion extending above the top side of the frame and a semispherical solid dome portion fitting within a semispherical dome cavity portion of the top side of the frame; and
   d. a locking guard operably attached to the frame, operating from a locked position to an unlocked position, having a spring for biasing the guard in the unlocked position and having a lever for locking the guard in the locked position where a turn of the lever in a first direction will unlock the guard and another turn of the lever in an opposite direction in combination with pressure applied against the spring will lock the guard.

2. The aerial sheave of claim 1 wherein the latch side may be located on either a left or a right side of the frame.

3. The aerial sheave device of claim 2 wherein the latch is attached to the frame via a hinge connection such that in the open position the latch swings out and away from the top side of the frame about the hinge towards a lower end of the pulley wheel.

4. The aerial sheave device of claim 2 wherein the latch is attached to the frame via a pivot pin connection such that in the open position the latch rotates parallel to the frame and towards a lower end of the pulley wheel.

5. The aerial sheave device of claim 1 wherein the pulley wheel has a substantially U shaped profile and the locking guard has an inverted substantially U shaped profile that meshes with the U shaped profile of the pulley wheel to form a closed cable passageway having a substantially O shaped profile when in the locking guard is in the locked position.

6. The aerial sheave device of claim 5 wherein the substantially U shaped profile of the pulley wheel includes outward flange and the inverted substantially U shaped profile of the locking guard has an inward flange, the respective flanges supporting the meshing of the pulley wheel and the locking guard.

7. The aerial sheave device of claim 1 wherein the lever of the locking guard is actuated by a 90 degree turn.

8. The aerial sheave device of claim 1 wherein the lever of the locking guard is actuated by a 270 degree turn or by a series of 360 degree turns.

9. The aerial sheave device of claim 1 wherein the loop portion of the swivel-loop attachment is attachable to a fixed pole and the frame is rotatable 360 degrees about the semispherical solid dome portion.

10. The aerial sheave device of claim 1 wherein the pulley wheel and the locking guard are made of non-conductive material and wherein the frame is made of nylon further includes an internal, non-exposed channel made of steel.

11. The aerial sheave of claim 10 wherein the internal, non-exposed channel made of steel has a U-shaped profile.

12. An aerial sheave device for the installation and suspension of cable comprising"
   a. a pulley wheel, having a substantially U shaped channel and an outward flange, rotating around an axle attached to a frame having a rigid side, a top side, and a latch side;
   b. a latch attached to the latch side of the frame for affording access to the wheel of the sheave, operating from an open to a closed position, having a spring loaded plunger biased in the closed position for securing the latch to the frame in the closed position;
   c. a swivel-loop attachment including a loop portion, attachable to a fixed pole, extending above the top side of the frame and a semispherical solid dome portion fitting within a semispherical dome cavity portion of the top side of the frame; and
   d. a locking guard, operably attached to the frame, operating from a locked position to an unlocked position, having a substantially inverted U shaped channel and an inward flange which meshes with the substantially U shaped channel and the outward flange of the pulley wheel, having a spring for biasing the guard in the unlocked position, and also having a lever for locking the guard in the locked position where a turn of the lever in a first direction will unlock the guard and another turn of the lever in an opposite direction in combination with pressure applied against the spring will lock the guard.

13. The aerial sheave of claim 12 wherein the latch side may be located on either a left or a right side of the frame.

14. The aerial sheave device of claim 13 wherein the latch is attached to the frame via a hinge connection such that in the open position the latch swings out and away from the top side of the frame about the hinge towards a lower end of the pulley wheel.

15. The aerial sheave device of claim 13 wherein the latch is attached to the frame via a pivot pin connection such that in the open position the latch rotates parallel to the frame and towards a lower end of the pulley wheel.

16. The aerial sheave device of claim 15 wherein the latch further comprises a stop tab which secures the latch to the frame in the closed position and also prevents the latch from swinging about the pin beyond 130 degrees in either direction when in the operating position.

17. The aerial sheave device of claim 16 wherein the lever of the locking guard is actuated by a 90 degree turn.

18. The aerial sheave device of claim 16 wherein the lever of the locking guard is actuated by a 270 degree turn.

19. The aerial sheave device of claim 16 wherein the loop portion of the swivel-loop attachment is attachable to a fixed pole and the semispherical solid dome portion for is rotatable 360 degrees.

20. The aerial sheave device of claim 19 wherein the pulley wheel and the locking guard are made of nylon and wherein the frame is made of nylon further includes an internal, non-exposed U-shaped channel made of steel.

* * * * *